April 18, 1933.  T. T. BAKER  1,903,971
COLOR PHOTOGRAPHY
Filed Nov. 7, 1931
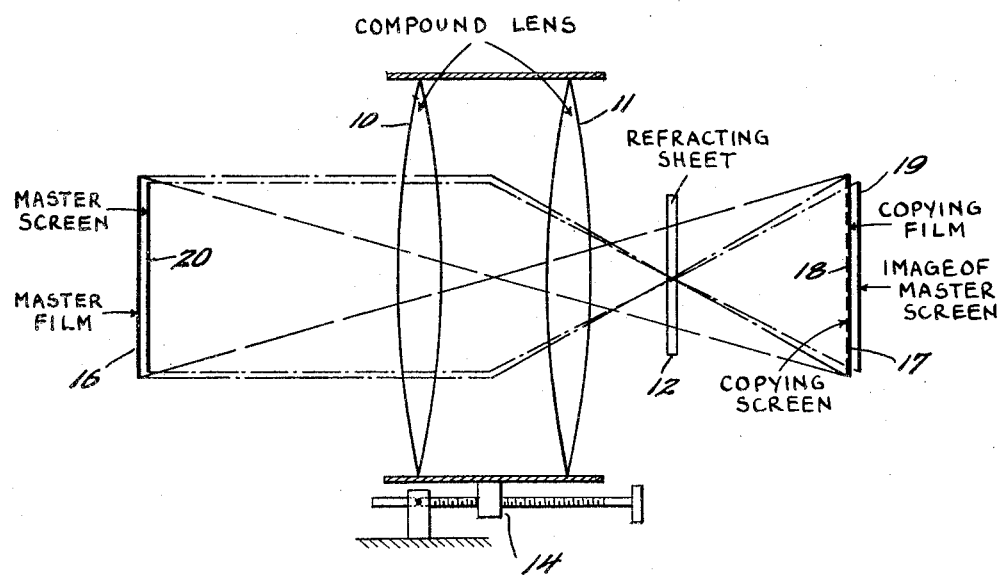

Patented Apr. 18, 1933

1,903,971

UNITED STATES PATENT OFFICE

THOMAS THORNE BAKER, OF MIDDLESEX, ENGLAND, ASSIGNOR TO SPICERS LIMITED, OF LONDON, ENGLAND, A BRITISH COMPANY

COLOR PHOTOGRAPHY

Application filed November 7, 1931, Serial No. 573,690, and in Great Britain November 7, 1930.

This invention comprises improvements in or relating to color-photography and is especially concerned with methods of printing from a master transparency in natural colors, for example, a cinematograph film, of the type in which a random or geometrical multicolor screen is associated with the transparency. The "master" film or transparency (i. e. the film or transparency from which the print is made which may or may not be the actual film originally taken) may either be a negative or it may have been reversed to form a positive.

In the former case, the "copying" film, (i. e. the film on which the print is made) will be a positive, while, in the latter case, it will be a negative, which can in turn be reversed to give a positive.

The production of multicolor screens of the linear type (and sensitized film embodying the same) for color-photography is described in British Specification No. 322,432.

In printing from black-and-white cinematograph films it is customary to use a projection lens of small aperture, for example, F/16 to F/32 in order to obtain sufficiently good definition of the picture. However, in the case of cinematograph films in natural colors of the above-mentioned type, if a lens of such aperture is employed to focus the silver image of the master film on to the copying film, a sharp image of the master color screen will at the same time be focussed on to the color screen associated with the copying film, with the result that interference effects, such as the moiré effect, will be set up so that satisfactory printing cannot normally be obtained.

It is the object of the present invention to provide a method of printing from colored transparencies of the above-described type, by the use of which this difficulty may be overcome.

According to the invention, an image of the picture on the master transparency is focussed on to the emulsion of the copying film by means of a lens of large aperture (e. g. F/2) and of such critical focus that the image of the master color screen which is formed in the plane of the copying color screen is sufficiently diffused to avoid the occurrence of interference effects (e. g. the moiré effect).

A single lens of such large aperture and critical focus would need to be very large and to have surfaces of very considerable curvature. Such a lens is difficult to construct and according to a feature of the invention, the lens may be built up of two lenses of equal aperture and focal length. This has the advantage that if each of the component lenses works at an aperture of F/4, the two when used together will give a combination having an effective aperture of F/2. The large aperture desired can thus be obtained with lenses of less cost and more convenient dimensions, and, in addition, the advantage of the high achromatism and defining powers of the F/4 lenses is secured. The two component lenses may conveniently be arranged close together (e. g. about two centimetres apart).

It will be understood that the multicolor screen in the case of a cinematograph film in natural colors of the kind to which the present invention relates, is separated from the sensitive emulsion by an intervening protecting layer, for example, gelatine or varnish or both of the order of about $8\mu$ in thickness.

It will also be understood that in multicolor screens of the kind referred to there are about one thousand figures to the linear inch (i. e. about one million figures to the square inch) so that although the separation of the multi-color screen and the sensitive emulsion is small, by the use of a lens of critical focus sufficient diffusion of the image of the fine figures of the master screen in the plane of the copying screen may be obtained for the avoidance of interference effects.

In carrying out the printing process, according to the invention, the compound lens is adjusted, say by a micrometer adjustment, so that the silver image of the master film is focussed sharply on to the copying emulsion. It is then found that the image of the master color screen which is formed in the plane of the copying color screen remains just sufficiently out of focus, and diffused to avoid interference effects being set up between this image and the copying color screen.

It has been proposed in British Specification No. 337,041 to avoid interference effects during printing from colored transparencies of the above-described type by placing a sheet of plain glass scored or indented with lines or depressions either in front of or behind the projection lens.

According to a feature of the present invention, a sheet of transparent singly refracting material having plain faces (i. e. faces which are not scored or indented) is disposed either in front of or behind the lens.

The sheet of transparent material may comprise a flat sheet of glass, e. g. a sheet of window glass or the glass of a photographic plate. Preferably, the thickness of the sheet of glass is between 3/64″ and 1/8″.

The effect of interposing the sheet of transparent material in the path of the printing rays is to render more diffused the image of the master color screen which is formed in the plane of the copying color screen (thus still further reducing the tendency of interference effects being set up) without interfering with the sharpness of the image of the picture on the master film which is focussed on to the copying film.

It is desirable that the thickness of the sheet of glass employed should be not less than 3/64″. If, however, the sheet of glass is made too thick, the definition of the photographic image produced on the copying film will suffer, and it is preferred not to use a sheet of glass of thickness greater than 1/8″. The best results are obtained by using a sheet of ordinary window glass of about $\frac{1}{16}$″ in thickness.

The single figure of the accompanying drawing comprises a diagrammatic view of one embodiment of the principles of the invention described herein.

In this arrangement a compound lens having an effective aperture of about F/2 and of such critical focus that it throws a sharp image of a given subject in substantially one plane only is employed to focus an image of the picture of the master film on to the copying film. The compound lens is formed of two similar lenses, indicated by the reference numerals 10, 11 in the drawing, each having a focal length of 180 mm. and an aperture of F/4, the two lenses being separated by a distance of about two centimetres. A sheet of window glass 12, approximately $\frac{1}{16}$″ in thickness is interposed in the path of the beam on the copying film side of the lens system. The lens system is provided with a micrometer adjustment indicated at 14. By means of this adjustment, the sharpest possible image of the picture of the master film 16 is focussed on to the copying film emulsion 17. The copying film is of course so placed that the light falling on to the emulsion must first of all pass through the copying color screen 18. It is found that when the lens has been focussed in this manner, the image 19 of the master color screen 20 formed in the plane of the copying color screen is sufficiently diffused to avoid interference effects being set up.

The method of printing, according to this invention, is particularly suitable for the printing of cinematograph films in color by the process described in my United States applications Nos. 345,246 and 345,247, both filed on March 7, 1929.

The invention also includes a photographic film in natural colors of the above-described type when printed by the method described and claimed herein.

I claim:

1. The method of avoiding the occurrence of interference effects when printing from colored transparencies of the color screen type onto a copying film also bearing a color screen which comprises sharply focussing an image of the picture on a master transparency onto the emulsion of the copying film by means of a lens of large aperture and of such critical focus that the image of the master color screen formed at the same time and in the plane of the copying color screen is sufficiently diffused to avoid the occurrence of interference effects.

2. The method of avoiding the occurrence of interference effects when printing from colored transparencies of the color screen type onto a copying film also bearing a color screen which comprises sharply focussing through a sheet of transparent singly refracting material having plain faces an image of the picture on a master transparency onto the emulsion of a copying film by means of a lens of large aperture and of such critical focus that the image of the master color screen which is formed in the plane of the copying color screen is sufficiently diffused to avoid the occurrence of interference effects.

3. The method of avoiding the occurrence of interference effects when printing from colored transparencies of the color screen type onto a copying film also bearing a color screen which comprises sharply focussing through a flat sheet of glass an image of the picture on a master transparency onto the emulsion of a copying film by means of a lens of large aperture and of such critical focus that the image of the master color screen which is formed in the plane of the copying color screen is sufficiently diffused to avoid the occurrence of interference effects.

4. The method of avoiding the occurrence of interference effects when printing from colored transparencies of the color screen type onto a copying film also bearing a color screen which comprises sharply focussing through a flat sheet of glass of thickness between 3/64 inch and 1/8 inch an image of the picture on a master transparency onto the emulsion of a copying film by means of a lens of large aperture and of such critical focus that the image of the master color screen which is formed in the plane of the copying color screen is sufficiently diffused to avoid the occurrence of interference effects.

5. The method of avoiding the occurrence of interference effects when printing from colored transparencies of the color screen type onto a copying film also bearing a color screen which comprises sharply focussing through a sheet of transparent singly refracting material having plain faces, an image of the picture on a master transparency onto the emulsion of a copying film by means of a lens system of large aperture built up of two component lenses of equal aperture and focal length and of such critical focus that the image of the master color screen which is formed in the plane of the copying color screen is sufficiently diffused to avoid the occurrence of interference effects.

6. The method of avoiding the occurrence of interference effects when printing from colored transparencies of the color screen type onto a copying film also bearing a color screen which comprises sharply focussing through a flat sheet of glass an image of the picture on a master transparency onto the emusion of a copying film by means of a lens system of large aperture built up of two component lenses of equal aperture and focal length and of such critical focus that the image of the master color screen which is formed in the plane of the copying color screen is sufficiently diffused to avoid the occurrence of interference effects.

7. The method of avoiding the occurrence of interference effects when printing from colored transparencies of the color screen type onto a copying film also bearing a color screen which comprises sharply focussing through a flat sheet of glass of thickness between 3/64 inch and 1/8 inch an image of the picture on a master transparency onto the emulsion of a copying film by means of a lens system of large aperture built up of two component lenses of equal aperture and focal length and of such critical focus that the image of the master color screen which is formed in the plane of the copying color screen is sufficiently diffused to avoid the occurrence of interference effects.

In testimony whereof I affix my signature.

THOMAS THORNE BAKER.